A. A. SPECHT.
COMBINED GAS AND COAL STOVE.
APPLICATION FILED NOV. 11, 1918.
1,385,726. Patented July 26, 1921.
5 SHEETS—SHEET 1.
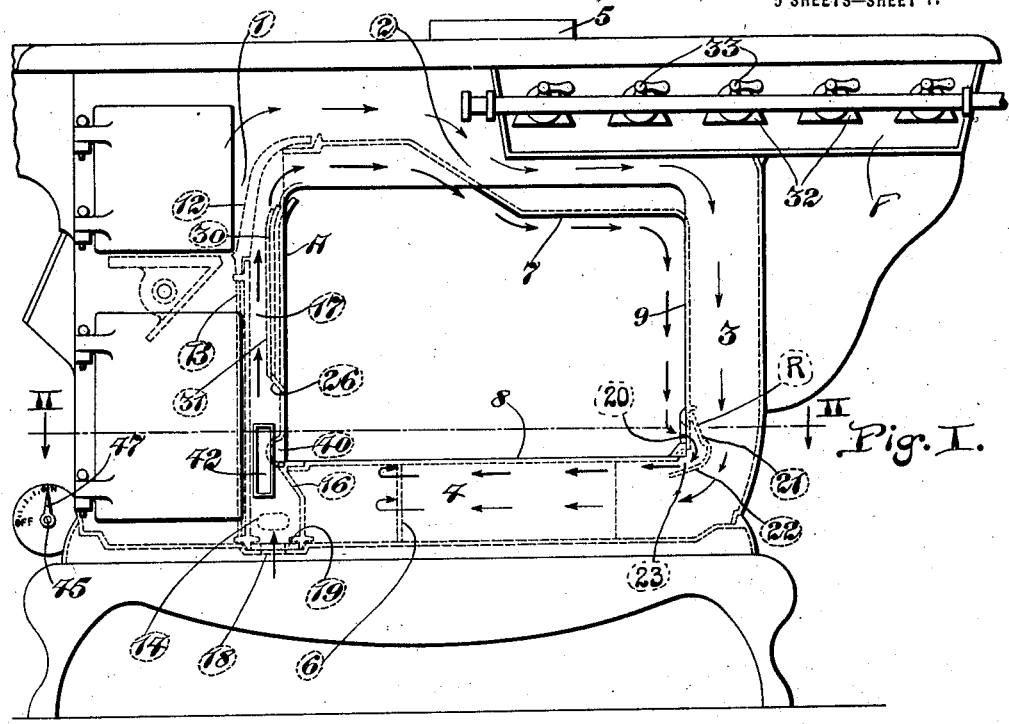
Fig. I.
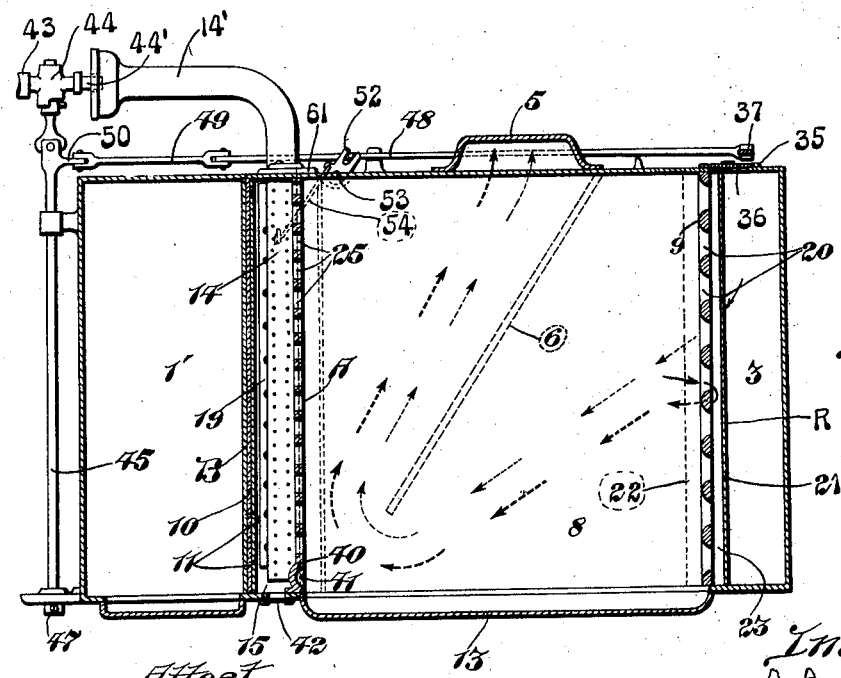
Fig. II.
Attest.
Charles A. Becker.
Inventor:
A. A. Specht
by
His Attorneys.

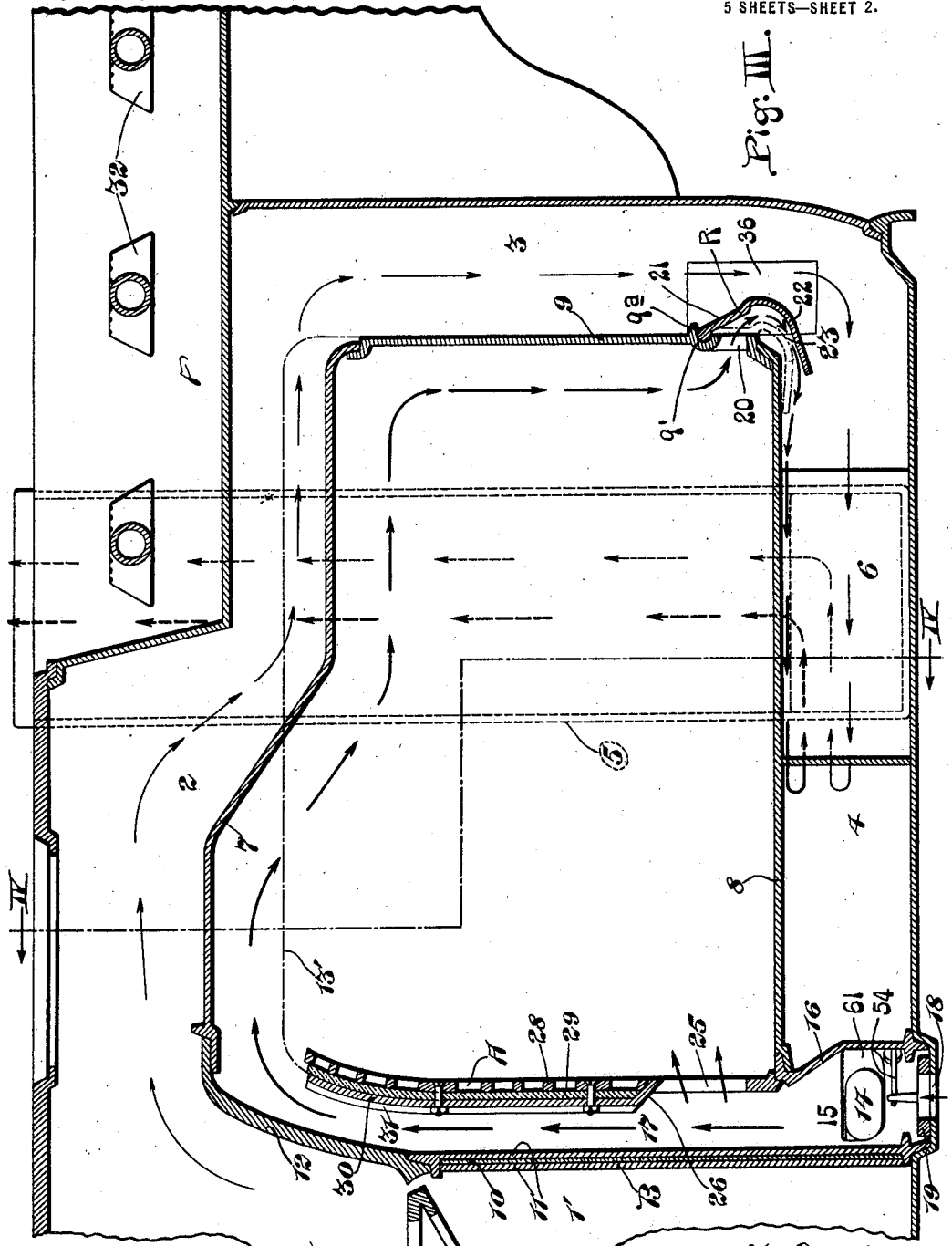

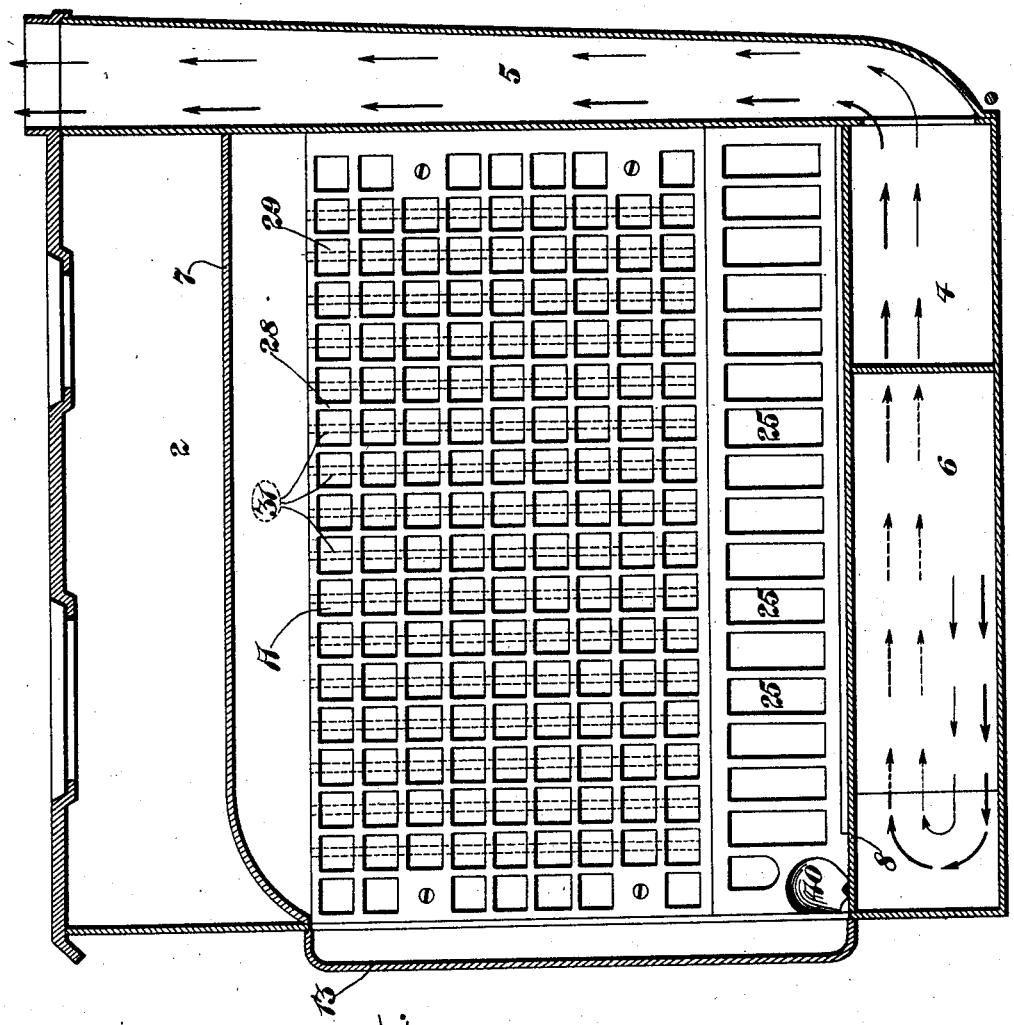

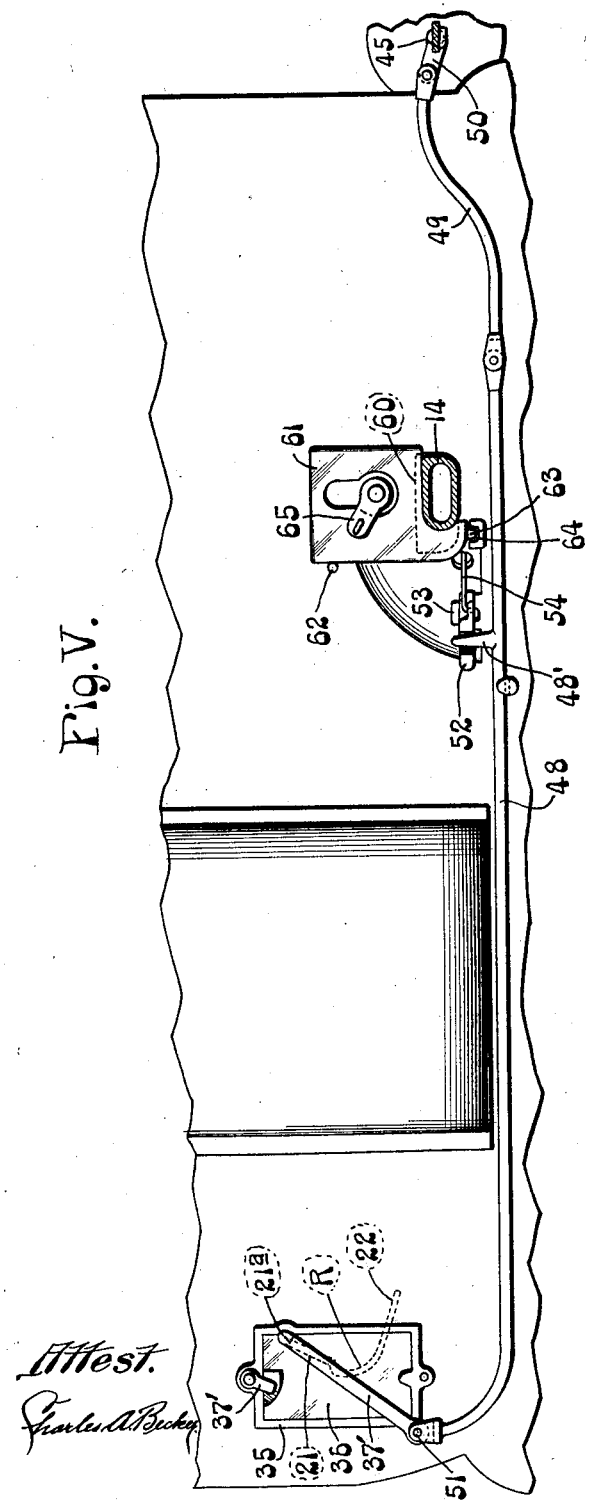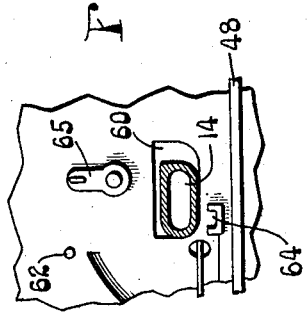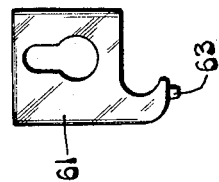

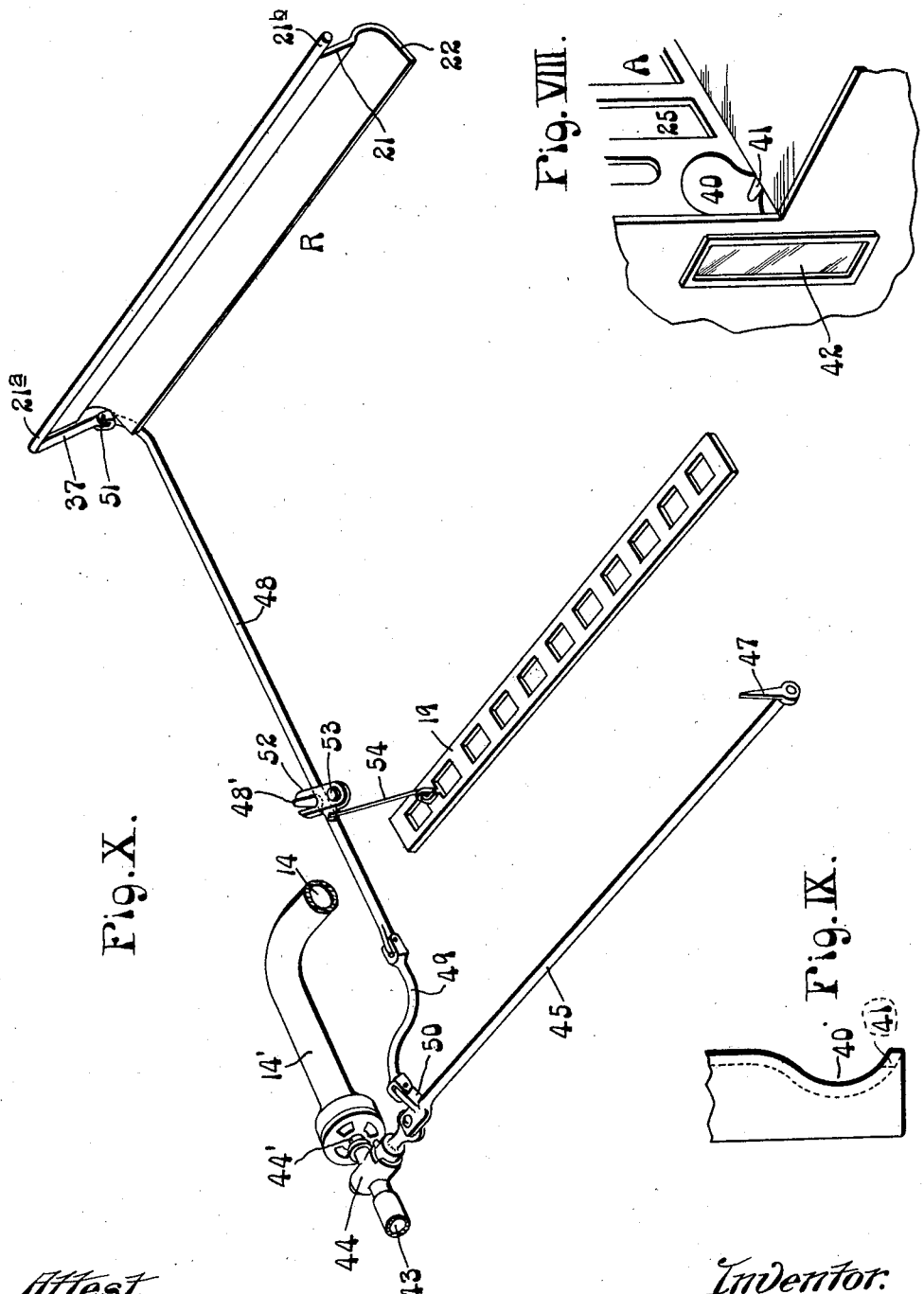

UNITED STATES PATENT OFFICE.

ADOLPH A. SPECHT, OF QUINCY, ILLINOIS, ASSIGNOR TO GEM CITY STOVE MANUFACTURING COMPANY, OF QUINCY, ILLINOIS, A CORPORATION OF ILLINOIS.

COMBINED GAS AND COAL STOVE.

1,385,726.        Specification of Letters Patent.     Patented July 26, 1921.

Application filed November 11, 1918. Serial No. 261,980.

*To all whom it may concern:*

Be it known that I, ADOLPH A. SPECHT, a citizen of the United States of America, a resident of Quincy, in the county of Adams, State of Illinois, have invented certain new and useful Improvements in Combined Gas and Coal Stoves, of which the following is a full, clear, and exact description, reference being had to the accompanying drawings, forming a part of this specification.

My invention relates to improvements in combined gas and coal stoves or ranges, one of the objects being to economize in the use of gas. Another object is to heat the oven uniformly throughout, instead of overheating some part of the oven, and maintaining another part in a relatively cool condition.

Another object is to combine the gas burner and its flues with a coal stove, without materially obstructing the flues of the coal stove. A further object is to facilitate the lighting of the gas burner whereby the oven is heated.

Another object is to provide a simple and efficient means for simultaneously adjusting the dampers and gas valve.

With the foregoing and other objects in view, the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Briefly stated, the structure I have shown comprises an ordinary coal stove, or range, provided with the usual fire box, flues, oven, etc., these elements being formed in the usual manner and in accordance with a general practice which has been followed for many years. The structure may also include a burner box, at the top of the stove, provided with a number of gas burners, said burner box being open at the top like the corresponding element of an ordinary gas stove. However, the most important features of the invention lie in the means for transmitting heat to the oven of the stove, or range, and the means for controlling the flow of the hot fluid whereby the burner is heated.

Figure I is a front elevation of the stove, or range, the oven door being omitted.

Fig. II is a horizontal section taken approximately on the line II—II, Fig. I, showing the oven door.

Fig. III is an enlarged vertical section showing the oven and the flues adjacent thereto.

Fig. IV is a vertical section taken approximately on the line IV—IV, Fig. III.

Fig. V is a fragmentary rear elevation showing the damper operating means.

Fig. VI is a fragmentary view illustrating the burner and the opening in which it is mounted.

Fig. VII is a detail view of the closure for the burner receiving opening.

Fig. VIII is a fragmentary perspective view showing a portion of the front of the stove and a portion of the interior of the oven.

Fig. IX is a detail view illustrating the gas-receiving pocket at the lower portion of one of the oven walls.

Fig. X is a diagrammatical view of the means for adjusting the gas valve and dampers.

The principal elements of the coal stove, or range, include a fire pot 1 (Figs. I and III), a top flue 2 leading from the top of the fire pot to the top of a vertical flue 3 at one side of the stove. A bottom flue 4 is formed between the bottom wall of the stove and the bottom of the oven. This bottom flue communicates with the vertical flue 3, and also with the usual vertical smoke passageway 5 at the rear of the stove, the lower end of said smoke passageway being in communication with the bottom flue, as shown most clearly in Figs. III and IV. The usual inclined deflector 6 is arranged between the bottom wall of the stove and the bottom of the oven.

The relatively light arrows indicate the course of the smoke and hot gases passing from the fire pot, and the heavy arrows indicate the course of the heating fluid which passes from a gas burner, as will be hereinafter described.

When used as a wood or coal stove, the smoke and hot gases passing from the fire pot (Figs. I and III) flow through the top flue 2 and vertical flue 3, to the bottom flue 4. In the bottom flue the smoke and hot gases flow around one end of the inclined deflector 6 and thence to the smoke passageway 5 at the rear of the stove.

7 designates the top wall of the oven. 8 designates the floor or bottom wall; 9 designates one of the side walls and A designates a side wall opposite to the wall 9. The usual ash compartment 1' (Figs. II and III), formed below the fire pot, is provided with a wall B which preferably consists of a sheet of asbestos 10 arranged between sheets of metal 11. The fire back 12 extends from the top of the wall B to the oven wall 7. 13 designates the oven door, shown in Figs. II and IV, the upper edge of this door being indicated by the dot and dash line 13' in Fig. III.

A long angular, or L-shaped, gas burner 14 (Figs. I, II and III) has a perforated portion which lies within a burner compartment 15 between the ash compartment and the bottom flue. One wall of the burner compartment forms a partition between said compartment and the bottom flue 4, and this wall, or partition, is inclined or offset as shown at 16 in Fig. III, for a purpose which will be hereinafter described. A vertical intake flue 17 (Figs. I and III) leads from the burner compartment 15 to the top wall of the oven, said flue being in free communication with an upper corner of the oven adjacent to the fire pot. This intake flue is formed between the walls A and B. The bottom of the burner compartment 15 is depressed and provided with air inlet openings 18 (Figs. I and III). 19 designates an elongated horizontal damper for regulating the flow of air through the openings 18. The lower portion of the oven wall 9 (Figs. II and III) is provided with outlet openings 20 at points above the oven bottom. R designates a combined damper and deflector in the form of an angular member, L-shaped in cross section (Figs. I, II, III and X) pivoted at its upper edge above the outlet ports 20, and extending entirely across the stove. This angular member R has a damper element 21 extending downwardly in the vertical flue 3 at points opposite the outlet openings 20, and a baffle element 22 extending forwardly in the bottom flue 4 adjacent to the bottom of the oven. A restricted angular passageway 23 is formed between the angular member R and the adjacent walls of the oven.

When the gas burner 14 is used to heat the oven, air is admitted through the inlet ports 18 (Fig. III) below the burner, and hot air rising from the burner flows through the vertical flue 17, to the main inlet at the top wall of the oven. At the beginning of the heating operation, the hot air accumulates in the top of the oven thereby forcing the relatively cool air through the outlet ports 20 near the bottom of the oven, and when the oven is completely filled with hot air, a circulation is maintained as indicated by the relatively heavy arrows. The hot air, passing through the outlet ports 20 near the bottom of the oven, flows through the restricted passageway 23 and enters the bottom flue 4, whereby it is conducted, as indicated by the heavy arrows, to the outlet passageway at the rear of the stove.

The lower portion of the vertical oven wall A is provided with auxiliary inlet ports 25 (Figs. II, III and IV) which place the oven in free communication with the vertical hot air duct 17. Immediately above the ports 25 the oven wall A is offset, or extended into the flue 17, as shown most clearly at 26 in Fig. III. The flue 17 therefore comprises a relatively wide lower portion below the offset 26, and a more restricted upper portion above said offset. The hot air tends to rise vertically in an absolutely straight line, and the air passing from the burner 14 therefore tends to rush rapidly through the vertical flue 17. However, all of the hot air does not pass entirely through flue 17. The hot air can rise freely in the wide lower end of flue 17, but when it strikes the extended portion 26 of the wall A the air is compressed to a certain extent, for it cannot rise so freely in the restricted upper portion of flue 17. As a consequence, some of the hot air, but only a relatively small proportion thereof, is discharged through the ports 25 and into the oven. A very much greater proportion of the hot air rises through the flue 17 to the top of the oven. The oven wall A comprises a grid 28 at the interior of the oven (Figs. III and IV), a sheet of asbestos 29, and a metal plate 30 provided with vertical ribs 31, said ribs being shown by full lines in Fig. III and by dotted lines in Fig. IV. The asbestos 29 is interposed between the grid 28 and the sheet metal plate 30 to avoid overheating the oven near the wall A, which lies adjacent to the hot air duct 17. For the same reason I use a grid 28 instead of a solid sheet of metal. Very little heat will be radiated from the elements of the grid 28. The vertical ribs 31 on the plate 30 are intended to serve as reinforcing elements. The wall A, including the layer of asbestos 29, lies adjacent to the fire-back 12 and prevents the upper lefthand corner of the oven from being overheated by the heat radiating from the fire-back when the device is used as a coal stove.

The burner box F (Figs. I and III) is provided with gas burners 32 and gas regulating valves 33. The bottom wall of the burner box extends over the oven and forms the top wall of a portion of the top flue. The top wall of the oven is offset downwardly below the burner box (Figs. I and III). However, the front edge of said top wall is flush with the top of the oven door, as suggested by Figs. I, III and IV.

Actual service tests have shown the following advantages:

The oven is heated uniformly throughout, instead of being overheated at some point and too cool at other points. The insulated wall A prevents the oven from being overheated at points adjacent to the vertical intake flue 17. The ports 25, at the bottom of wall A, permit some of the hot air to enter the oven at a point which would otherwise be relatively cool. These ports 25 lie opposite to the outlet ports 20 at which the air is discharged from the oven. If the ports 25 were not present, there would be no appreciable circulation of air in the lower left-hand corner of the oven. Another important point to note is that the hot air enters at an upper corner of the oven and escapes near a lower corner diagonally opposite to the inlet. As a result the hot air cannot take a short path to the outlet of the oven. It must accumulate in the oven, the hottest air being at the top of the oven, and the oven being always entirely full of hot air. It is also important to note that the floor of the oven is heated uniformly throughout, enabling the user to bake by arranging the pans on the oven floor. This floor is heated partly by the hot air passing from the restricted passageway 23 (Fig. III) at one corner of the oven, this air being delivered directly to the bottom face of the oven floor, and the hottest air will remain in contact with said bottom face until it escapes through the pipe at the rear of the stove. It will be observed that the hot air alone would not heat the oven floor uniformly throughout, for the reason that the air current turns at the end of the inclined deflector plate 6 and then takes a short path to the outlet passageway 5 at the rear of the stove. In other words, that portion of the oven floor which lies near the burner is not heated very effectively by the hot air in the bottom flue 4. To heat the last mentioned portion of the oven floor, one of the side walls of the burner compartment is offset, as shown at 16 in Fig. III, to provide an inclined heat receiving face directly above and adjacent to the burner; this inclined portion 16, extending downwardly from the oven bottom, is exposed directly to the flame, and becomes very hot. This heat is conducted from the metal of the inclined element 16 to the metal in the adjacent portion of the oven floor, so as to effectively heat that portion of the oven floor which is not thoroughly heated by the hot air.

The combined deflector and damper R (Fig. III) extending around one lower corner of the oven, forms a restricted outlet passageway for the hot air, thus preventing the hot air from escaping freely from the oven. When coal is used to heat the oven, the smoke and hot coal gases pass downwardly in the vertical flue 3 and thence into the bottom flue 4, under the oven. At this time the combined damper and deflector R occupies the closed position, shown by dotted lines in Fig. III, wherein the damper element 21 closes the ports 20 in the vertical oven wall 9, while the outer edge of the baffle element 22 engages the bottom wall of the oven.

It is important to observe that the combined damper and deflector R, when located in the closed position shown by dotted lines in Fig. III, does not materially obstruct the flues 3 and 4 through which smoke is conducted when coal is used, and since the restricted passageway 23 (Fig. III) is then closed by the elements 21 and 22, the smoke will not pass through or into said passageway 23, and no soot will accumulate therein. The combined damper and deflector, located in two of the smoke flues, very effectively performs its functions when gas is used to heat the oven, and when coal is used this device closes communication between the smoke flues and the oven, without materially choking or obstructing the smoke flues. The soot accumulating on the outer faces of this damper and deflector will be loosened by the jarring action to which the device is subjected when it is quickly thrown from one position to another. As a further safeguard, to exclude smoke and soot from the oven, the upper edge of the combined damper and deflector R (Figs. III and X) is approximately circular in cross-section, and this rounded edge is arranged in a correspondingly formed groove 9′ in the oven wall 9. An abutment flange 9$^a$ (Fig. III) formed on the oven wall 9, projects over the rounded upper edge of the damper element, so as to deflect smoke and soot away from said rounded edge. The rounded portion is extended at the ends of the damper element 21, (Fig. X) to provide trunnions 21$^a$ and 21$^b$ whereby the combined damper and deflector is pivotally supported.

To permit the removal of the combined damper and deflector, a door frame 35 (Fig. V) is secured to the rear wall of the stove, and a door or closure 36 (Figs. II, III and V) is removably mounted in said frame. 37′ designates a pivotally mounted latch finger (Fig. V) whereby the closure 36 is normally held in its closed position. When the closure 36 is removed, the damper and deflector R can be withdrawn through the frame 35. The trunnion 21$^a$ (Figs. V and X) lies between the closure 36 and the frame 35. A damper-operating arm 37 (Figs. V and X), located at the exterior of the stove, extends downwardly from the trunnion 21$^a$. Obviously, this arm 37 can be oscillated for the purpose of opening and closing the combined damper and deflector R.

To facilitate the lighting of the oven burner, the oven wall A (Figs. I, II and VIII) has a pocket or cavity 40, and a gas inlet port 41 at the bottom of said depression or cavity. The small port 41 lies directly above the burner 14, and when the gas is turned on, a small stream of the gas will escape through the port 41, to the cavity 40, and thence into the oven. It is therefore easy for the gas to be ignited by opening the oven door and placing a lighted match in the cavity 40. A mica window 42 (Figs. I, II and VIII) is formed in the front wall of the stove, near the burner 14.

A gas conductor 43 (Figs. II and X) leading to the burner is provided with a regulating valve 44. 45 designates a horizontal operating shaft connected to the valve 44 and provided with an operating handle 47. The gas supply can be easily regulated by manipulating the handle 47. A long horizontally disposed connecting member 48 (Figs. II, V and X) is flexibly connected by means of a link 49 to a short arm 50 extending from the oscillatory shaft 45. The long connecting member 48 reciprocates in response to the oscillatory movements of the shaft 45. The operating arm 37, extending from the combined damper and deflector R, is pivoted at 51 to the connecting member 48. This member 48 is preferably a rod provided with a lateral projection 48' mounted in a slot in the free end of an arm 52, the latter being pivoted at 53. 54 designates a wire-like link connecting the arm 52 to the slidable intake damper 19. The horizontal connecting rod 48 lies at a right angle to the operating shaft 45 and also to the dampers, but it will be observed that motion is transmitted from this connecting rod, so as to actuate the dampers in response to movements of the operating shaft 45 whereby the flow of gas is controlled. The dampers and gas valve are therefore regulated simultaneously, and when the gas valve is closed both dampers occupy their closed positions.

The angular gas burner 14 comprises a perforated discharge member which lies within the burner compartment and an intake member 14' arranged at an angle to the discharge member. The gas regulating burner 44 has an extension 44' (Figs. II and X) which extends into the hollow intake member 14'. To remove the burner from the stove, the intake member 14' must be withdrawn from the extension 44', and to accomplish this the discharge member of the burner must be moved transversely in the burner compartment. To provide for a movement of this kind the burner compartment has a relatively large burner-receiving opening 60 (Figs. V and VI) through which the burner is inserted into and removed from the burner compartment. To detach the burner 14 from the gas conductor it is necessary to move the burner in the opening 60, from the position shown in Fig. V to the position shown in Fig. VI. 61 designates a closure normally coöperating with the burner to close the relatively large opening 60. This closure lies above and at one side of the burner and it engages a pin 62 (Fig. V) on the rear wall of the stove. It also has, at its lower edge, a projection 63 extending into a recess 64. A detachable fastening device in the form of a pivoted finger 65 extends through a slot in the closure 61 and coöperates with the closure, as shown in Fig. V, to retain the burner 14 in its normal position. The burner is thus secured or fastened, and the relatively large burner-receiving opening is closed, partly by the burner and partly by the closure 61 which forms part of the means for securing the burner in the large opening.

I claim:

1. A combined gas and coal stove having a fire pot, an oven, a bottom flue under the bottom of the oven communicating with said fire pot, a vertical flue at one side of the oven, the upper corner of the oven at the top of said vertical flue being provided with a main inlet for heating fluid, an outlet for the heating fluid being formed at the lower corner of the oven diagonally opposite to said main inlet, said bottom flue being in communication with said outlet, a burner compartment at the lower end of said vertical flue, a burner in said burner compartment, said burner being lower than the adjacent lower corner of the oven, the side of the oven adjacent to said vertical flue being provided with an auxiliary heating fluid inlet adjacent to the bottom of the oven, said vertical flue being extended from said burner comparment to the main inlet at said upper corner of the oven and said auxiliary inlet being in free communication with said vertical flue at a point above the burner, so as to provide for the admission into the oven of a portion of the heating fluid rising in the said vertical flue, and said vertical flue being contracted above said auxiliary inlet to retard the fluid flowing to said main inlet.

2. A combined gas and coal stove having a fire pot, an oven provided with top, bottom and side walls, a down flue at one side wall of the oven, a top flue leading from the fire pot to said down flue, a bottom flue under the oven bottom and in communication with said down flue, the upper corner of the oven, adjacent to said fire pot, being provided with an inlet for the heating fluid, an intake flue for the heating fluid formed between the fire pot and the adjacent wall of the oven, a burner located near the lower end of said intake flue so as to heat the fluid passing to said inlet, the side wall of the oven adjacent to said down flue having an outlet for the heating fluid, said outlet being above and adjacent to the bottom of the oven, a combined damper and deflector pivotally supported above said outlet externally of the oven and extending around the lower corner of the oven adjacent to said outlet, said combined damper and deflector being extended downwardly in said down flue and forwardly in the bottom flue to form a restricted angle shaped passageway leading from said outlet to the bottom flue, and operating means for swinging the pivotally supported damper toward and away from the adjacent corner of the oven so as to close and open said restricted passageway.

3. A combined gas and coal stove having a fire pot, an oven provided with top, bottom and side walls, a down flue at one side wall of the oven, a top flue leading from the fire pot to said down flue, a bottom flue under the oven bottom and in communication with said down flue, the upper corner of the oven adjacent to said fire pot being provided with an inlet for the heating fluid, an intake flue for the heating fluid formed between the fire pot and the adjacent wall of the oven, a burner located near the lower end of said intake flue so as to heat the fluid passing to said inlet, the side wall of the oven adjacent to said down flue having an outlet for the heating fluid, said outlet being above and adjacent to the bottom of the oven, a combined damper and deflector pivoted externally of the oven at the upper edge of said combined damper and deflector which lies in said down flue and above said outlet, said combined damper and deflector being an angle member having a damper element extending downwardly from the pivot and located in said down flue at a point opposite said outlet, said angle member also having a baffle element extending from said damper element and into said bottom flue, the angle member constituting said combined damper and deflector being thus extended around the adjacent lower corner externally of the oven to form a restricted angle shaped passageway, and operating means for swinging said combined damper and deflector toward and away from said lower corner of the oven, the oven wall adjacent to said down flue having a recess for the reception of the pivoted upper edge of said combined damper and deflector.

4. A combined gas and coal stove having a fire pot, an oven provided with top, bottom and side walls, a down flue at one side wall of the oven, a top flue leading from the fire pot to said down flue, a bottom flue under the oven bottom and in communication with said down flue, the upper corner of the oven adjacent to said fire pot being provided with an inlet for the heating fluid, an intake flue for the heating fluid formed between the fire pot and the adjacent wall of the oven, a burner located near the lower end of said intake flue so as to heat the fluid passing to said inlet, the side wall of the oven adjacent to said down flue having an outlet for the heating fluid, said outlet being above and adjacent to the bottom of the oven, a combined damper and deflector pivoted at its upper edge which lies in said down flue and above said outlet, said combined damper and deflector being an angle member having a damper element extending downwardly from the pivot and located in said down flue at a point opposite said outlet, said angle member also having a baffle element extending from said damper element and into said bottom flue, the angle member constituting said combined damper and deflector being thus extended around the adjacent lower corner externally of the oven to form a restricted angle shaped passageway, and operating means for swinging said combined damper and deflector toward and away from said lower corner of the oven, the oven wall adjacent to said down flue having an abutment which overlies the pivoted upper edge of said combined damper and deflector.

In testimony that I claim the foregoing I hereunto affix my signature.

ADOLPH A. SPECHT.